United States Patent [19]

Jennings et al.

[11] Patent Number: 4,903,992

[45] Date of Patent: Feb. 27, 1990

[54] LOCKING RING FOR OIL WELL TOOL

[75] Inventors: Charles E. Jennings; L. Steven Landriault, both of Houston, Tex.

[73] Assignee: Vetco Gray Inc., Houston, Tex.

[21] Appl. No.: 338,283

[22] Filed: Apr. 14, 1989

[51] Int. Cl.⁴ .............................................. F16L 15/00
[52] U.S. Cl. ........................................ 285/24; 285/141; 285/307; 285/321; 285/334
[58] Field of Search ............ 285/141, 334, 392, 334.1, 285/24, 18, 333, 307, 321

[56] References Cited

U.S. PATENT DOCUMENTS

| | | | |
|---|---|---|---|
| 2,542,679 | 2/1951 | Kemnitz | 285/334 X |
| 2,737,248 | 3/1956 | Baker . | |
| 2,849,245 | 8/1958 | Baker . | |
| 4,410,204 | 10/1983 | Reimert | 285/24 |
| 4,534,583 | 8/1985 | Milberger et al. . | |
| 4,607,865 | 8/1986 | Hughes . | |
| 4,655,479 | 4/1987 | Farr, Jr. | 285/333 X |
| 4,714,111 | 12/1987 | Brammer | 285/141 X |
| 4,773,477 | 9/1988 | Putch . | |
| 4,844,510 | 7/1989 | Theiss et al. | 285/334 X |

Primary Examiner—Thomas F. Callaghan
Attorney, Agent, or Firm—James E. Bradley

[57] ABSTRACT

A connection assembly secured a running tool into a tubular casing hanger. The connection assembly includes a frusto-conical threaded section on a running tool and a nose section of cylindrical shape located below the threaded section. The casing hanger has a bore with at least one circumferential recess. A collet ring having internal threads is initially carried on the nose section. The collet ring lands in the recess when the running tool is moved into the casing hanger. Continued movement causes the collet ring to deflect outward. The collet ring has threads on its inner diameter that slide on the threads of the running tool to latch the members together. Slots in the collet ring enable the outward deflection to occur. A pin engages the collet ring to enable rotation of the running tool relative to the collet ring to unscrew the members from each other.

6 Claims, 3 Drawing Sheets

4,903,992

LOCKING RING FOR OIL WELL TOOL

BACKGROUND OF THE INVENTION

1. Field of the Invention:

This invention relates in general to devices for connecting a tubular member into a tubular housing, and in particular to a locking ring that connects a string of conduit to a casing hanger being lowered into a subsea wellhead housing.

2. Description of the Prior Art:

There are a number of applications in offshore well systems in which a tubular member is latched into a housing and remotely released. In one occurrence, a running tool will be latched into a casing hanger at the drilling vessel. The casing hanger will be located at the top of a string of casing being lowered into the well. The running tool lowers the casing hanger into position within a subsea wellhead housing located on the sea floor. Once in place, the running tool may be released and pulled to the surface.

Various mechanisms are employed to connect the running tool to the casing hanger. Some require that the running tool be retrieved back to the surface before cementing can occur. Others are complex and difficult to run. Others are unable to withstand great weights if the casing is extremely heavy due its size and length.

SUMMARY OF THE INVENTION

In this invention, the running tool or tubular member has a frusto-conical threaded section. A nose section extends below the threaded section a selected distance. The housing or casing hanger into which the tubular member stabs has a circumferential recess.

A collet ring is carried on the running tool, initially on the nose section below the threaded section The collet ring has internal threads and an external load shoulder. The collet ring has slots that allow it to expand from a cylindrical shape to a frusto-conical shape once the collet lands on the casing hanger recess. An anti-rotation pin in the casing hanger prevents rotation of the collet ring. This enables the running tool to be removed from the casing hanger by rotation.

DESCRIPTION OF THE PREFERRED EMBODIMENT

Figure 1:
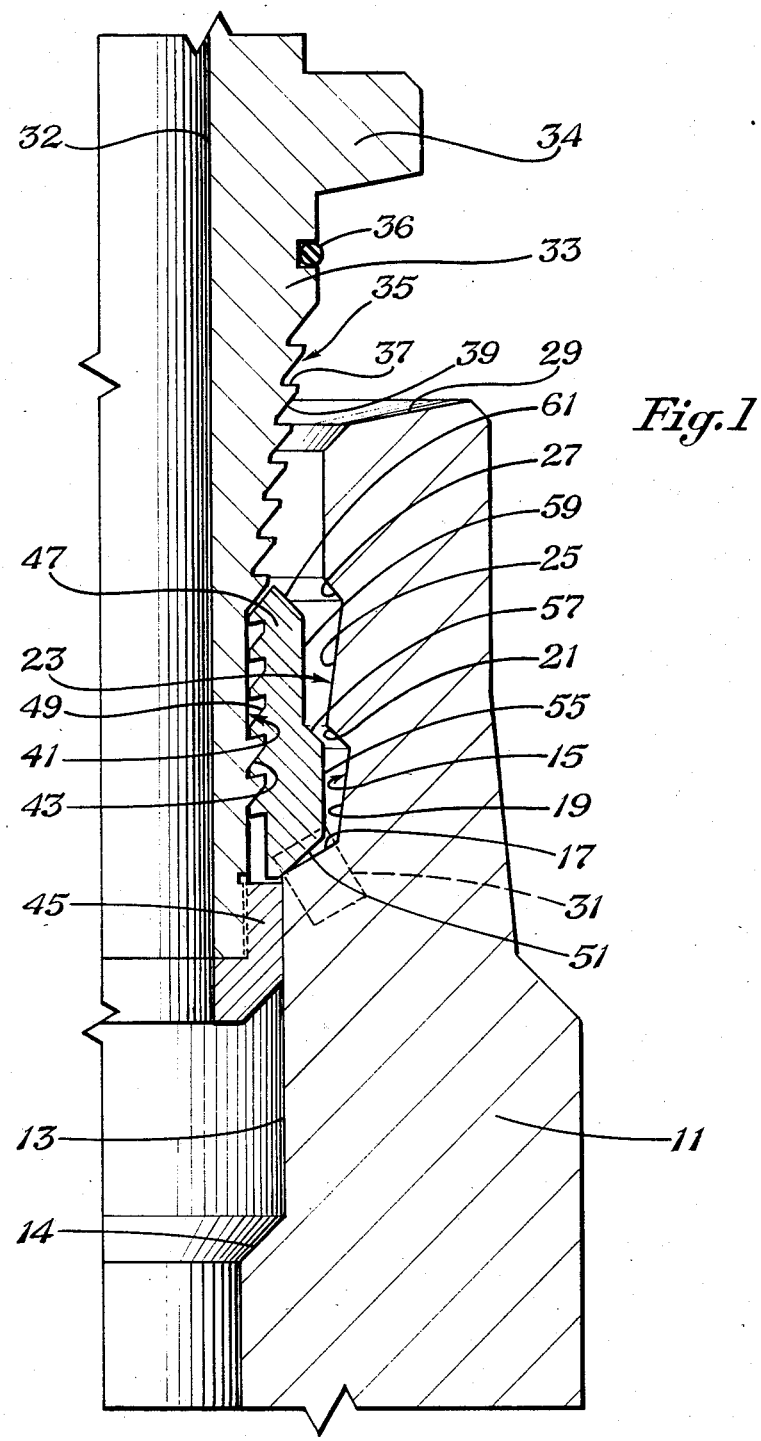
FIG. 1 is a partial vertical sectional view illustrating a connection means constructed in accordance with this invention, showing a running tool stabbed into a casing hanger, but prior to latching engagement.

Referring to the Figures, particularly FIG. 1, casing hanger 11 comprises a housing having a bore 13 extending through it. A string of casing (not shown) will be connected to the lower end of casing hanger 11. Bore 13 has a shoulder 14. A lower recess 15 is located above the shoulder 14. Lower recess 15 has a lower shoulder 17 which is frusto-conical and faces upward. Lower recess 15 has a side or base 19 which is a frusto-conical surface, also. Base 19 converges from a larger diameter at its upper termination to a lesser diameter at its intersection with the lower shoulder 17. The upper end of base 19 joins an intermediate shoulder 21. Intermediate shoulder 21 is frusto-conical and faces downward.

An upper recess 23 extends upward from the intermediate shoulder 21. Upper recess 23 has a base 25 that is frusto-conical. Base 25 is at the same inclination as the lower recess base 19. It has a larger diameter at its upper termination than at its lower termination. An upper shoulder 27 is located at the upper end of the base 25. The upper shoulder 27 is frusto-conical and faces generally downward, parallel with the intermediate shoulder 21. A rim 29 is formed on the upper end of the casing hanger 11. Rim 29 is slightly conical. An anti-rotation pin 31 protrudes upward from the lower shoulder 17.

A running tool 33 will locate in the bore 13 of casing hanger 11. Running tool 33 is a tubular member having a bore 32 that is coaxial with the bore 13. The upper end of running tool 33 will normally be secured to casing (not shown) which is used to lower the running tool 33 and casing hanger 11 into the wellhead housing (not shown) on the subsea floor.

An external flange 34 extends radially outward from the running tool 33. Flange 34 has a lower side that is adapted to contact the casing hanger rim 29 when the running tool 33 is stabbed into the casing hanger 11. Running tool 33 has a threaded section 35 that begins a selected distance below the flange 34. The portion of the running tool 33 between the threaded section 35 and the flange 34 is cylindrical and contains an O-ring seal 36.

The threaded section 35 is frusto-conical. It tapers from a larger diameter at its upper termination to a smaller diameter at the lower termination. The threads of threaded section 35 are preferably left-hand. Also, they preferably are of a multi-start type, containing a plurality of separate threads, such as three, each of which extends the full length of the threaded section 35.

The threads of threaded section 35 are generally of a saw-tooth configuration. Each has an upper flank 37 that is at a slight inclination relative to the axis of bore 32. That is, each upper flank 37 is at a few degrees relative to a plane that is perpendicular to the axis of the bore 32. The slope is slightly downward proceeding from the outer edge of each flank 37 inward. Each thread of threaded section 35 also has a lower flank 39. Lower flank 39 inclines downward at a considerably greater angle than the upper flank 37.

Running tool 33 has a nose section 41 that extends downward from the lower end of the threaded section 35. Nose section 41 is cylindrical and of a smaller diameter than the running tool 33 at the seal 36. The axial length of nose section 41 is somewhat greater than the axial length of the threaded section 35. Two threads or teeth 43 are located on the nose section 41 between its ends. The threads 43 have the same configuration as the threads of the threaded section 35 and are left-hand. A threaded retaining ring 45 secures to the lower end of the nose section 41.

Retaining ring 45 retains a collet ring 47 on the nose section 41. The collet ring 47 will move from an initial relaxed position shown in FIG. 1 to an engaged latching position shown in FIG. 2. The threads 43 retain the collet ring 47 in the initial position while the running tool 33 is being lowered into the casing hanger 11.

Collet ring 47 has a threaded section 49. While in the initial position, threaded section 49 is cylindrical. The threads of the threaded section 49 are of the same configuration as the threads of the running tool thread section 35. They are multi-start and left-hand. While in the initial position, the threads 43 engage two of the threads of the threaded section 49.

Collet ring 47 has a lower shoulder 51. Shoulder 51 will contact the casing hanger lower shoulder 17 when the running tool 33 is stabbed into the casing hanger 11. Lower shoulder 51 is frusto-conical to mate with the casing hanger shoulder 17. A plurality of cavities or recesses 53 (FIG. 3) are located in the lower shoulder 51. The anti-rotation pin 31 will locate within one of the recesses 53 to prevent rotation of the collet ring 47.

Collet ring 47 has an intermediate shoulder 57 that faces upward and outward. Intermediate shoulder 57 is positioned to engage the intermediate shoulder 21. Collet ring 47 has a lower exterior wall 55 that extends upward from the lower shoulder 51 to intermediate shoulder 57. An upper exterior wall 59 extends upward from the intermediate shoulder 57. While in the initial position, the exterior walls 55, 59 are cylindrical. While in the latching position, they deflect outward to take on a frusto-conical configuration with the same taper as the recess bases 19 and 25. Collet ring 47 has an upper shoulder 61 located at its upper end. Upper shoulder 61 is frusto-conical for mating with the recess upper shoulder 27.

Collet ring 47 has slot means which allows the upper portion of the collet ring 47 to deflect outward when moving to its latched position. The slot means includes a plurality of upper slots 65. The upper slots 65 extend through the wall of the collet ring 47 beginning at the upper shoulder 61. The upper slots 65 extend downward to a point above the collet ring lower shoulder 51. In the preferred embodiment there are about 24 upper slots 65 spaced around the collet ring 47. Also, in the preferred embodiment, there are four lower slots 67 spaced equally around the collet ring 47. The lower slot 67 extend from the lower shoulder 51 upward to a point below the upper shoulder 61.

In operation, a string of casing will be made up and lowered into the well from the drilling vessel. The casing hanger 11 will be secured to the upper end of the string of casing. The running tool 33 will be secured to the casing hanger 11 while both are located on the drilling vessel. First, the collet ring 47 will be screwed onto the nose section 41. The threads 43 will engage the threaded section 49 of the collet ring 47. The retaining ring 45 will be secured in place. All of the threads of the threaded section 49 will be located below the threaded section 35. The collet ring threaded section 47 will be cylindrical in configuration in this initial position.

Figure 3:
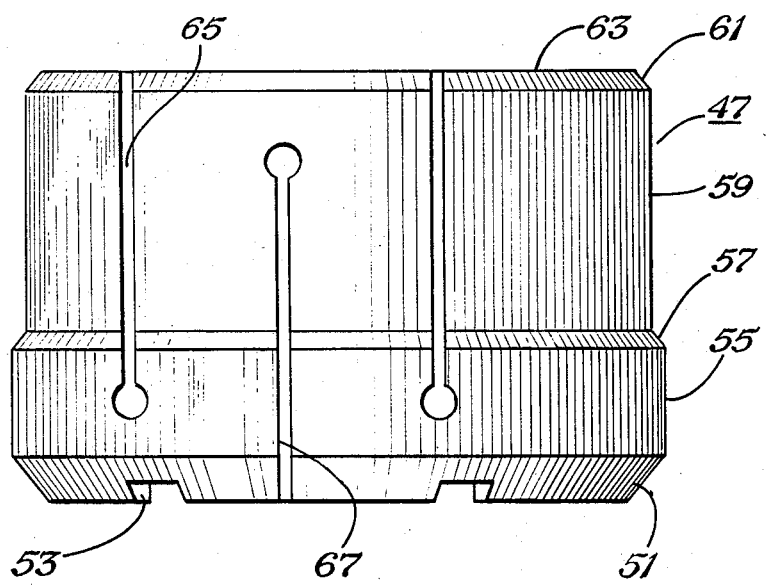
FIG. 3 is a side view of the collet ring used with the connection means of FIG. 1.

Then, the running tool 33 will be stabbed into the bore 13 of the casing hanger 11. The lower shoulder 51 of collet ring 47 will contact the casing hanger lower shoulder 17. Slight rotation will cause the anti-rotation pin 31 to register with one of the recesses 53 (FIG. 3). Left hand rotation of the running tool 33 causes the threaded section 49 to disengage from the threads 43. Downward force applied to the running tool 33 causes the running tool 33 to move downward relative to the collet ring 47. The collet ring threaded section 49 will slide over the threads of the threaded section 35.

The threaded section 35 forces the upper portion of the collet ring 47 to deflect outward into a conical configuration, with the upper and lower slots 65, 67 allowing this expansion to occur. The deflection is elastic, and does not cause a permanent deformation of the collet ring 47. When the running tool 33 has moved downward as much as possible relative to the collet ring 47, the flange 34 will be slightly above the rim 29. The threaded sections 35, 49 will not yet be in threaded engagement with each other, although the threaded section 49 will be in the frusto-conical configuration at this point. The running tool 33 will then be rotated less than one full turn to the left. The multi-start threads 35, 49 allow make-up in less than one turn. This causes the threaded section 35 to make-up fully with the threaded section 49. The flange 34 will contact the rim 29 at full make-up.

Then, sections of conduit, preferably casing, will be secured to the upper end of the running tool 3, and the running tool 33 and casing hanger 11 will be lowered from the drilling vessel into a riser (not shown) leading to the subsea wellhead. The running tool 33 will support the full weight of the string of casing extending below the casing hanger 11 until the casing hanger 11 lands in the wellhead housing on the sea floor.

Figure 2:
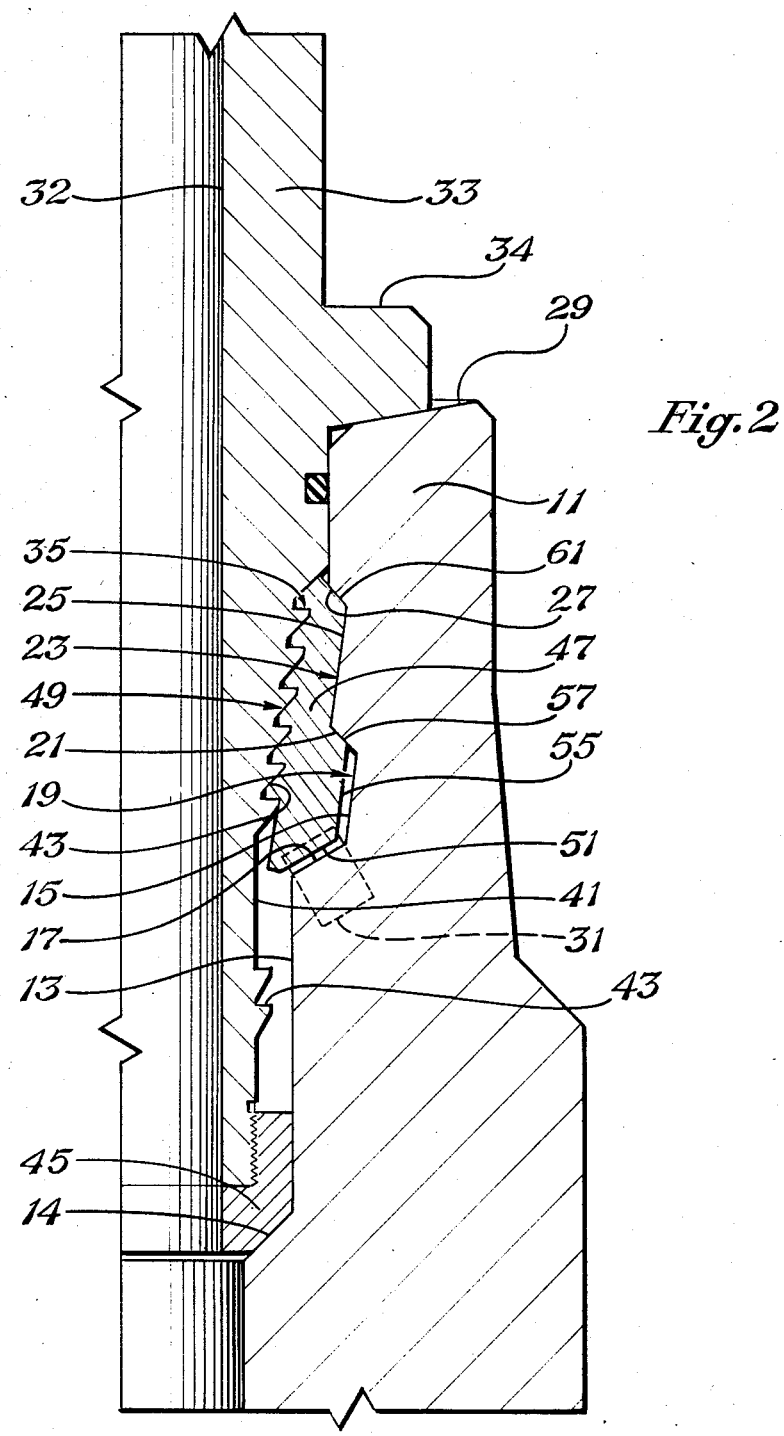
FIG. 2 is a view of the connection means of FIG. 1, showing the assembly fully latched into place.

FIG. 2 shows the assembly in the fully made-up position and in tension due to the weight of casing below the casing hanger 11. The retaining ring 45 will be spaced slightly above the bore shoulder 14. The collet ring lower shoulder 51 will be spaced slightly above the recess lower shoulder 17. The collet ring exterior shoulder 55 will be spaced inward a slight distance from the lower recess base 19. The collet ring intermediate shoulder 57 will be in engagement with the recess intermediate shoulder 21. The collet ring upper exterior wall 59 will be in engagement with the upper recess base 25. The collet ring upper shoulder 61 will be in engagement with the recess upper shoulder 27. The flange 34 may be spaced slightly above the casing hanger rim 29 as during tension, no load transmits through the flange 34 and rim 29. Downward load on the casing hanger 11 will be transmitted from the mating shoulders 27, 61 and 21, 57 to the threaded sections 35, 49.

Once the casing hanger 11 has landed in the wellhead housing, cement can be pumped down the upper string of casing, through the running tool 33, down the lower string of casing and back up the annulus in the well surrounding the casing. A packoff will subsequently be set between the exterior of the casing hanger 11 and the wellhead housing. The running tool will be retrieved to the drilling vessel.

Retrieving the running tool is accomplished by rotating the string of casing above the running tool to the right. This unscrews the threaded section 35 from the collet ring threaded section 49. Upward pull on the running tool 33 will disengage the running tool 33 from the casing hanger 11. The collet ring 47 will return to its cylindrical configuration, as shown in FIG. 1. It will be retained by the retaining ring 45 as the running tool 33 is pulled to the surface.

The invention has significant advantages. The conical threads and conical load shoulders enable large tension forces to be supported. The connection means latches and unlatches easily and is simple in construction.

While the invention has been shown in only one of its forms, it should be apparent to those skilled in the art that it is not so limited, but is susceptible to various changes without departing from the scope of the invention. The connection means between the casing hanger and running tool could be applied to other tubular members and housings.

We claim:

1. A connection means for securing a tubular member into a tubular housing having a bore, comprising in combination:

a frusto-conical threaded section on the tubular member having a set of threads;
at least one circumferential recess formed in the bore of the housing, defining an upward facing lower shoulder and a downward facing upper shoulder;
a collet ring having a set of internal threads, an external downward facing lower shoulder and an external upward facing upper shoulder;
slot means formed in the collet ring to allow at least the upper portion of the collet ring to expand radially outward from a relaxed position to an engaged position, the internal threads of the collet ring having a generally cylindrical configuration while in the relaxed position, and having a frusto-conical configuration while in the engaged position;
the lower shoulder of the collet ring being positioned to contact the housing lower shoulder as the tubular member stabs into the housing, with further downward movement of the tubular member causing the threaded section to slide on the internal threads of the collet ring with the slot means allowing the collet ring to expand outward and causing the collet ring upper shoulder to engage the housing upper shoulder; and
anti-rotation means in the housing for preventing rotation of the collet ring relative to the housing, enabling the tubular member to be removed from the housing by rotating the tubular member to unscrew the internal threads from the threaded section.

2. A connection means for securing a tubular member into a tubular housing having a bore, comprising in combination:
a frusto-conical threaded section on the tubular member having a set of threads, diverging from a smaller diameter at a lower end of the threaded section to a larger diameter at an upper end of the threaded section;
a generally cylindrical nose section on the tubular member below the threaded section, having a diameter substantially the same as the smaller diameter of the threaded section;
at least one circumferential recess formed in the bore of the housing, defining an upward facing lower shoulder and a downward facing upper shoulder;
a collet ring having a set of internal threads, an external downward facing lower shoulder and an external upward facing upper shoulder;
slot means formed in the collet ring to allow at least the upper portion of the collet ring to expand radially outward;
the collet ring being initially carried on the nose section, with the internal threads being in a generally cylindrical configuration, and with the lower shoulder of the collet ring positioned to contact the housing lower shoulder as the tubular member stabs into the housing, with further downward movement of the tubular member causing the threaded section to slide on the internal threads of the collet ring, expanding the internal threads into a frusto-conical configuration, and causing the collet ring upper shoulder to engage the housing upper shoulder; and
anti-rotation means in the housing for preventing rotation of the collet ring relative to the housing.

3. A connection means for securing a tubular member into a tubular housing having a bore, comprising in combination:

a frusto-conical threaded section on the tubular member having a set of threads, diverging from a smaller diameter at a lower end of the threaded section to a larger diameter at an upper end of the threaded section;
a generally cylindrical nose section on the tubular member below the threaded section, having a diameter substantially the same as the smaller diameter of the threaded section;
at least one circumferential recess formed in the bore of the housing, having an upward facing lower shoulder and a downward facing upper shoulder;
a collet ring having a set of internal threads, an external downward facing lower shoulder, and an external upward facing upper shoulder, the collet ring being carried initially on the nose section, with the internal threads being in a generally cylindrical configuration,;
slot means formed in the upper section of the collet ring to allow the internal threads of the collet ring to expand radially outward from a cylindrical configuration to a frusto-conical configuration;
the lower shoulder of the collet ring being positioned to contact the housing lower shoulder as the tubular member stabs into the housing, with further downward movement of the tubular member causing the threaded section to slide on the internal threads of the collet ring, expanding the internal threads into the frusto-conical configuration, and causing the collet ring upper shoulder to engage the housing upper shoulder;
anti-rotation means in the housing for preventing rotation of the collet ring relative to the housing, enabling the tubular member to be rotated relative to the collet ring to fully make-up the internal threads with the threaded section and to unscrew the internal threads from the threaded section to allow the tubular member to be pulled upward from the housing; and
retaining means on the nose section for retaining the collet ring on the nose section after the tubular member has been unscrewed from the collet ring and pulled upward from the housing.

4. A connection means for securing a tubular member into a tubular housing having a bore, comprising in combination:
a frusto-conical threaded section on the tubular member having a set of threads;
upper and lower circumferential recesses formed in the bore of the housing, the lower recess having an upward facing lower shoulder and a downward facing intermediate shoulder, the upper recess having a downward facing upper shoulder;
a collet ring having a set of internal threads, an external downward facing lower shoulder, an external, upward facing intermediate shoulder, and an upper rim;
slot means formed in the collet ring to allow the internal threads of the collet ring to expand radially outward from an initial generally cylindrical configuration to a frusto-conical configuration;
the lower shoulder of the collet ring being positioned to contact the housing lower shoulder as the tubular member stabs into the housing, with further downward movement of the tubular member causing the threaded section to slide on the internal threads of the collet ring, expanding the upper portion of the collet ring outward, causing the collet ring intermediate shoulder to engage the lower recess intermediate shoulder, and causing the collet ring upper rim to engage the upper recess upper shoulder; and anti-rotation means in the housing for preventing rotation of the collet ring relative to the housing.

5. A connection means for securing a tubular member into a tubular housing having a bore, comprising in combination:

a frusto-conical threaded section on the tubular member having a set of threads diverging from a smaller diameter at a lower end of the threaded section to a larger diameter at an upper end of the threaded section;

a generally cylindrical nose section on the tubular member below the threaded section, having a diameter substantially the same as the smaller diameter of the threaded section;

upper and lower circumferential recesses formed in the bore of the housing, the lower recess having an upward facing lower shoulder and a downward facing intermediate shoulder, the upper recess having a downward facing upper shoulder;

a collet ring having a set of internal threads, an external downward facing lower shoulder for engaging the lower recess lower shoulder, an external upward facing intermediate shoulder for engaging the lower recess intermediate shoulder, and an upper rim for engaging the upper recess upper shoulder;

the collet ring being carried initially on the nose section in a relaxed condition with the internal threads having a generally cylindrical configuration;

slot means formed in the collet ring to allow the internal threads of the collet ring to expand radially outward from the relaxed condition to a frusto-conical configuration when tubular member stabs into the housing;

at least one cavity located in the lower shoulder of the collet ring; and a pin located on the lower shoulder of the lower recess for engaging the cavity to prevent rotation of the collet ring relative to the housing, enabling the tubular member to be made-up in the housing by rotating the tubular member in one direction and to remove the tubular member from the housing by rotating in the other direction.

6. A connection means for securing a tubular member into a tubular housing having a bore, comprising in combination:

a frusto-conical threaded section on the tubular member having a set of external threads;

a nose section on the tubular member below the threaded section;

at least one thread member located in the nose section a selected distance below the threaded section;

at least one circumferential recess formed in the bore of the housing, defining an upward facing lower shoulder and a downward facing upper shoulder;

a collet ring having a set of internal threads, an external downward facing lower shoulder and an external upward facing upper shoulder;

slot means formed in the collet ring to allow at least the upper portion of the collet ring to expand radially outward;

the collet ring being carried in an initial position on the nose section with the thread member engaging at least part of the internal threads to retain the collet ring in the initial position, the lower shoulder of the collet ring being positioned to contact the housing lower shoulder as the tubular member stabs into the housing; and anti-rotation means in the housing for preventing rotation of the collet ring relative to the housing once the collet ring lower shoulder contacts the recess lower shoulder, enabling the tubular member to be rotated to unscrew the internal threads from the thread member, with further downward movement of the tubular member causing the external threaded section to slide on the internal threads of the collet ring to expand the internal threads into a frusto-conical configuration, and causing the collet ring upper shoulder to engage the housing upper shoulder.

* * * * *